United States Patent [19]

Hasegawa et al.

[11] Patent Number: 4,923,629
[45] Date of Patent: May 8, 1990

[54] METHOD AND FLOCCULANT FOR WATER TREATMENT

[75] Inventors: Takao Hasegawa, Toda; Takuya Onitsuka, Sagamigara; Minoru Suzuki; Yasuhiro Ehara, both of Tokyo; Katsuhiro Hashimoto, Yamato; Tadamasa Ozaki, Machida, all of Japan

[73] Assignee: Suido Kiko Kabushiki Kaisha, Tokyo, Japan

[21] Appl. No.: 190,984

[22] Filed: May 6, 1988

[51] Int. Cl.$^5$ .................................. C02F 1/52
[52] U.S. Cl. .................... 252/181; 252/180; 210/724; 210/716
[58] Field of Search ............... 252/181, 180; 210/724, 210/723, 716

[56] References Cited

U.S. PATENT DOCUMENTS

| | | | |
|---|---|---|---|
| 4,110,212 | 8/1978 | Krofchak | 210/724 |
| 4,332,693 | 6/1982 | Piepho | 252/181 |
| 4,404,105 | 9/1983 | Rysman de Lockerente et al. | 210/724 |
| 4,415,467 | 11/1983 | Piepho | 252/181 |

FOREIGN PATENT DOCUMENTS

| | | |
|---|---|---|
| 971180 | 12/1958 | Fed. Rep. of Germany . |
| 2555980 | 6/1985 | France . |
| 59-53081 | 12/1984 | Japan . |
| 618895 | 3/1949 | United Kingdom . |

OTHER PUBLICATIONS

"Silicates as Aids to Coagulation" by John R. Baylis (Journal of the American Water Works Association, vol. 29, No. 9, 1937).

"Coagulation of Aluminum Sulfate with Silica" by Fukutaka Takeda (Water Treatment Technics (Mizushori Gijutsu), vol. 5, No. 8, pp. 1-7, 1964, Japan).

"Study on Activated Silica Suited for Longer Storage" by Tamon Ishibashi et al. (Suido Kyokai Zasshi No. 447, pp. 23-28, 1971, Japan).

"Activated Silica and its Character" by Katsumi Goto et al. (Water Treatment Technics (Mizushori Gijutsu), vol. 2, No. 10, 1961, Japan).

*Primary Examiner*—Paul Lieberman
*Assistant Examiner*—Christine A. Skane
*Attorney, Agent, or Firm*—Armstrong, Nikaido, Marmelstein, Kubovcik & Murray

[57] ABSTRACT

A method and flocculant for water treatment in which the highly polymerized silicic acid and a water-soluble salt of a metal capable of forming a hydroxide in water such as aluminum are added to the water to be treated. The highly polymerized silicic acid can be prepared by polymerizing water glass. In the case where the highly polymerized silicic acid and the water-soluble metal salt are prepared as a flocculant in the form of aqueous solution before adding to the water to be treated, the flocculant is maintained at a pH value of not less than about 2 or not lower than about 11. The flocculant may be a silicic acid solution of which the gel time is prolonged by being added with a substance capable to generate ferrice ion in the solution so that the flocculant can maintain high aggregation ability after being stored for a long time. The silicic acid solution may be polymerized before being added with such ferric ion generating substance.

6 Claims, No Drawings

METHOD AND FLOCCULANT FOR WATER TREATMENT

BACKGROUND OF THE INVENTION

1. Field of the Invention

This invention relates to a method and flocculant for chemical treatment applicable to various kinds of water including waste water.

2. Prior Arts

In water purification and waste-water treatment, various kinds of flocculants are used to remove impurities and other substances dispersed in the water. For example, aluminum sulfate, inorganic low-molecular flocculants such as ferric chloride, inorganic polymer flocculants such as polymerized aluminum chloride (PAC) and organic polymer flocculants such as polyacrylamide are used.

Although aluminum sulfate ($Al_2(SO_4)_3.18H_2O$) is used most popularly because of relatively low cost, this flocculant is not a highly effective flocculant. Namely, the aggregation velocity is slow, the size of formed flocs is small, and adequate aggregation is not performed especially when the temperature of the treated water is low. Also, aluminum sulfate decreases alkalinity so much that a large amount of basic chemicals or other aggregation aids must be used together.

A solution of ferric chloride ($FeCl_3.xH_2O$) offers several aggregation advantages, such as formation of larger flocs and efficient coprecipitation with various kinds of heavy metals. But a solution of ferric chloride is corrosive and does not have high stability. Besides, it must be used with slaked lime, which, in turn, results in the production of a very large quantity of sludge. Baking such sludge tends to cause secondary environmental pollution.

Polymerized aluminum chloride (PAC) ($Al_2(OH)_nCl_{6-n}$) has come to be used extensively in place of aluminum sulfate because of its ability to achieve adequate aggregation even at low temperatures and form flocs relatively rapidly. But, as the production process of PAC involves many intricate conditions difficult to control, the products of uniform quality having the same level of aggregating properties are difficult to obtain. Moreover, the cost of PAC is much higher than aluminum sulfate.

Polyacrylamide ($CH(CO)(NH_2)(CH_2)_n$) and other organic polymer flocculants form larger flocs at higher speeds. But they involve a serious shortcoming that the treated water is not always safe.

Furthermore, in such aggregation and precipitation processes stated above, aggregation aids are often used with main flocculants. Activated silicic acid is one of such aggregation aids widely used. But the activated silicic acid has an important drawback in that it cannot maintain its aggregating ability when stored for a long time. Namely, activated silicic acid, which is usually prepared by adding acid to silicic acid, becomes gelled in a short time, and gelled silicic acid can no longer be used as a flocculant. As such, it is only for about one day after preparation that activated silicic acid can be used as an aggregation aid. This is the major drawback in the use of activated silicic acid as an aggregation aid.

SUMMARY OF THE INVENTION

The object of this invention is to provide a safe and low-cost method and flocculant for water treatment that can form larger flocs at higher speed and can be implemented at temperatures and pH's of wider ranges.

In the water treatment of this invention, highly polymerized silicic acid is used as a flocculant, together with a small amount of metal salt. In the conventional water treatment methods using aluminum sulfate and the like, activated silica has been used as an aggregation aid. That is, not highly polymerized silicic acid has been used in a mol ratio of about 1:1 maximum with the aluminum contained in aluminum sulfate.

The inventors have found that highly polymerized silicic acid, when used with a small quantity of metal ion, exhibits a superior ability to form flocs. Based upon this finding, the inventors have developed a new water treatment method using polymerized silicic acid as the main flocculating agent.

The polymerized silicic acid can be prepared by polymerizing commercially available water glass (sodium silicate) until the limiting viscosity thereof becomes about twice greater than the limiting viscosity (0.104) of monosilicic acid. It is preferable that polymerization be carried out either in an acid solution or in an alkaline solution.

The metallic ions that can coexist with polymerized silicic acid are those of aluminum and iron that are now commonly used as flocculants. Also usable are the ions of such metals as copper, zinc, manganese and calcium that can form hydroxides in water. These metals are used by dissolving them in solutions such as those of sulfuric and nitric acids. When a preliminarily prepared solution containing both polysilicic acid and metal ions is used as a flocculant, it is preferable to use an acid metal salt with a silicic acid polymerized in an acid region and an alkaline metal salt with a silicic acid polymerized in an alkaline region.

Thus, the water treatment method and flocculant of this invention have a high degree of aggregating effect on the impurities contained in the water to be treated, by the use of the solutions of highly polymerized silicic acid obtained from low-priced water glass and various kinds of metals that can produce such metal ions as can form hydroxides in water. The water treatment method and flocculant have such advantages as the excellent aggregating effect on water of low temperatures and the considerable saving of water treatment cost over the conventional ones.

Water treatment is carried out by pouring approximately 20–30 mg of a solution of said polysilicic acid and metal salt to each liter of the water to be treated so that the mol ratio of silicon to metal, or Si/M, becomes about 2.5 to 15 when the metal is aluminum. Preferable Si/M mol ratios for other metals than aluminum are as follows:

| Iron | Si/Fe | 2.5 to 15 |
|---|---|---|
| Zinc | Si/Zn | 1 to 14 |
| Copper | Si/Cu | 2 to 18 |
| Magnesium | Si/Mg | 2 to 10 |
| Manganese | Si/Mn | 0.5 to 20 |
| Lead | Si/Pb | 6 to 20 |
| Cobalt | Si/Co | 4 to 10 |
| Calcium | Si/Ca | 0.5 to 22 |
| Tin | Si/Sn | 2 to 18 |

The solutions of polysilicic acid and metal salt may be separately poured into the water to be treated and stirred together. Or a preliminarily mixed solution of polysilicic acid and metal salt may be poured into the water to be treated.

When allowed to stand at ordinary temperature, polysilicic acid becomes further polymerized and then sets to gel. The polysilicic acid that has changed into a gel cannot be used as a flocculant. So it is desirable to inhibit the progress of further polymerization once polysilicic acid has been prepared. Polymerization of polysilicic acid progresses faster when the pH value of the solution of polysilicic acid is closer to neutrality and more slowly when the acidity or alkalinity of the solution is stronger. Therefore, it is desirable to keep the acidity or alkalinity of the solution of polysilicic acid at a considerably high level. For example, silicic acid polymerized in an acid solution at a pH of 4 sets to gel in approximately 8 hours when the pH of the solution is left unchanged. When the pH value of the solution is changed to 2 by the addition of diluted sulfuric acid, on the other hand, the same polysilicic acid remains stable even after 140 hours, exhibiting a satisfactory aggregating property.

Silicic acid polymerized in an alkaline solution at a pH of 9 sets to gel in about 35 minutes when the pH value is left unaltered. If the pH value is changed to 11 by the addition of 4N-NaOH, the gelation time increases to approximately 120 hours. When polysilicic acid is prepared near the water treatment site, no special care will be needed about the control of pH. But when polysilicic acid prepared at a distant place or a flocculant containing such silicic acid is used after being transported and stored at the water treatment site, it is preferable to keep the pH value either below about 2 or above about 11.

The further object of the present invention is to provide a flocculant which can maintain the high aggregating ability even when stored for long time and can be used either singly or jointly with other flocculant.

The flocculant comprises silicic acid added with iron salts. It has been found out that the gel time of silicic acid can be remarkably delayed by the addition of iron ion. The invention which has achieved to provide a new flocculant that can maintain their aggregating ability even when stored for a long time is based on the above finding.

Commercially available water glass can be used as the silicic acid in the preparation of the flocculant according to the invention, too. Water glass may be dissolved in either an acidic or alkaline solution. Preferably, the silicon concentration of the solution of silicic acid, either acidic or alkaline, should be approximately between 0.5 percent and 2 percent. Iron salt may be added to the prepared solution of silicic acid either directly or after polymerization. Addition of iron salt after polymerization provides higher aggregating ability to the produced flocculant.

Such ferric salts as ferric chloride are suited for being added to the solution of silicic acid. But any other iron salts that can generate ferric ion in the solution may be used as well. The flocculant of the invention is obtained by adding such iron salts dissolved in water or other solvent to the solution of silicic acid in such a manner that the mol ratio of Si/Fe becomes approximately between 0.1 and 15. The flocculant of thus prepared remains ungelled and maintains adequate aggregating ability even after about 5000 hours if stored in a container of glass or the like at a temperature of 20° C. or thereabout.

The flocculant of the invention may be used by pouring it singly into the water to be treated. When used alone, it is desirable to use polymerized silicic acid in preparation. A flocculant made from a combination of polymerized silicic acid and iron salt exhibits a very high aggregating ability. When used as an aggregation aid with an aluminum sulfate, like ordinary activated silica, good result is obtained when about 0.3 ml/l of the flocculant of this invention is added to 30 mg/l of aluminum sulfate. Still greater effect will be obtained if the salt of iron or other metal exists in the water to be treated with a flocculant of the invention. This can be achieved either by adding the salt of other metal when the flocculant is prepared or adding the salt of iron or other metal to the water to be treated with the flocculant.

The foregoing and other objects, features and advantages of the present invention will be understood more clearly and fully from the following detailed description of preferred embodiments.

DETAILED DESCRIPTION OF THE PREFERRED EMBODIMENTS

EXAMPLE 1

Two kilograms of an acid solution of silicic acid at a pH of 4 having a silicon concentration of 1.5 percent was obtained by mixing 1 kg of 2.3 percent diluted sulfuric acid, with 1 kg of an aqueous solution of water glass with a silicon concentration of 3 percent (or a silicon dioxide concentration of 6.4 percent), which was prepared by diluting commercially available "Class 4 water glass" with water, with stirring. The obtained acidic solution of silicic acid was polymerized into a solution of polysilicic acid by slowly stirring at room temperature (27° C.). Sample A1, sample A2 and sample A3 were taken from the container holding the solution of polysilicic acid at given intervals or, more specifically, 2, 4 and 6 hours after the start of the polymerization, respectively. The limiting viscosity of the individual samples determined by the method according to JIS (Japanese Industrial Standard) Z 8803 is shown below:

| Sample A1 | 0.21 |
| Sample A2 | 0.36 |
| Sample A3 | 0.67 |

Then, 20% sulfuric acid was added to each sample to control the pH value to 2.0.

Aggregation tests were conducted on the water to be treated (at a temperature of 25° C. with a turbidity of 219 mg/l) by a jar test (with rapid, medium and slow stirring performed at 120 rpm for 2 minutes, 60 rpm for 3 minutes and 30 rpm for 2 minutes, respectively), using flocculants prepared by adding aluminum sulfate ($Al_2(SO_4)_3 \cdot 18H_2O$) to said samples. The flocculants were poured into the water to be treated so that the amount of aluminum sulfate in the water became 60 mg per liter. Then, a test was conducted to vary the mol ratio of silicon and aluminum in each specimen. Table 1 shows the time taken between the start of the test and the appearance of aggregated flocs and the average size of the obtained flocs. The floc sizes were determined on the basis of the photographs taken during the test. A, B and other alphabetic characters in the table represent the following size ranges:

| | |
|---|---|
| A | 0.2 mm and under |
| B | 0.2 mm to 0.3 mm |
| C | 0.3 mm to 0.5 mm |
| D | 0.5 mm to 1.0 mm |
| E | 1.0 mm to 1.5 mm |
| F | 1.5 mm to 2.0 mm |
| G | 2.0 mm to 5.0 mm |
| H | 5.0 mm and over |

TABLE 1

| | Sample | | | | | |
|---|---|---|---|---|---|---|
| | A1 | | A2 | | A3 | |
| Si/Al Mol Ratio | Floc Appearance Time (sec) | Floc Size | Floc Appearance Time (sec) | Floc Size | Floc Appearance Time (sec) | Floc Size |
| 0.6 | 50 | B | 50 | B | 60 | B |
| 1.2 | 30 | C | 40 | C | 55 | C |
| 2.4 | 25 | D | 30 | D | 30 | D |
| 3.6 | 23 | E | 25 | E | 20 | E |
| 4.8 | 15 | E | 15 | E | 15 | E |
| 5.9 | 20 | E | 20 | F | 20 | F |
| 7.1 | 30 | E | 25 | F | 20 | F |
| 8.3 | 40 | F | 30 | F | 20 | F |
| 9.5 | 45 | D | 32 | F | 20 | G |
| 11 | 53 | C | 35 | G | 20 | G |

As is obvious from the above test results, the acid solutions of polysilicic acid has exhibited adequate aggregating effects even when the ratio of the coexisting metal was low, with an increase in the degree of polymerization bringing about more effective aggregation.

EXAMPLE 2

Samples A4, A5 and A6 were prepared by adding solutions of different metal salts given below to an acid solution of polysilicic acid prepared by the method employed in Example 1. (The acid solution was taken 3 hours after the start of polymerization and had a limiting viscosity of 0.27). With the samples poured into the same water (at 25° C.) to be treated as that used in Example 1 so that the amount of metal salt in the water became 60 mg per liter, jar tests were conducted under the same conditions as in Example 1.

| | | |
|---|---|---|
| Sample A4 | (copper sulfate) | Si/Cu mol ratio = 4.4 |
| Sample A5 | (zinc chloride) | Si/Zn mol ratio = 3.6 |
| Sample A6 | (manganese chloride) | Si/Mn mol ratio = 7.1 |

The floc appearance time and average floc size with the individual samples were as shown in Table 2.

TABLE 2

| Sample | A4 | A5 | A6 |
|---|---|---|---|
| Floc Appearance Time (sec) | 13 | 12 | 8 |
| Average Floc Size | E | E | E |

Obviously, the acid solution of polysilicic acid has exhibited excellent aggregating effects in the presence of the ions of other metals than aluminum, too.

EXAMPLE 3

Samples A7 to A11 were prepared by individually adding and dissolving copper sulfate, ferric nitrate, zinc chloride, manganese chloride and magnesium chloride to an acid solution of polysilicic acid prepared by the method employed in Example 1. (The acid solution was taken 4 hours after the start of polymerization.) The samples A7 to A11 and the sample A2 used in Example 1 were put to aggregation tests of the water to be treated whose temperature was as low as 3° C. (with a turbidity of 220 mg/l). The samples were added so that the amount of metal salt in the water became 80 mg per liter. The mol ratios of silicon to other metals in the samples were as follows:

| | | |
|---|---|---|
| Sample A2 | Si/Al mol ratio | 5.0 |
| Sample A7 | Si/Cu mol ratio | 4.4 |
| Sample A8 | Si/Fe mol ratio | 5.2 |
| Sample A9 | Si/Zn mol ratio | 2.4 |
| Sample A10 | Si/Mn mol ratio | 7.1 |
| Sample A11 | Si/Mg mol ratio | 3.4 |

The floc appearance time and average floc size with the individual samples were as shown in Table 3.

TABLE 3

| Sample | A2 (Al) | A7 (Cu) | A8 (Fe) | A9 (Zn) | A10 (Mn) | A11 (Mg) |
|---|---|---|---|---|---|---|
| Floc Appearance Time (sec) | 60 | 25 | 20 | 10 | 10 | 40 |
| Average Floc Size | F | E | E | E | F | G |

As can be seen, the acid solution of polysilicic acid produced excellent aggregating effects, in the presence of various kinds of metal ions, on the low-temperature water, too.

EXAMPLE 4

With water, commercially available "Class 4 water glass" was diluted to produce an aqueous solution having a silicon concentration of 1.5 percent (or a silicon dioxide concentration of 3.2 percent). 20% sulfuric acid was then added to 500 g of the obtained aqueous solution of water glass to adjust the pH value to 9. The solution was allowed to polymerize with slowly stirring at room temperature (25° C.). After 15 minutes, a 4N (N=normality) solution of sodium hydroxide was added to attain a pH of 11. By stopping the stirring and allowing to stand, an alkaline solution of polysilicic acid having a limiting viscosity of 1.25 was obtained. Sample A12 was prepared by adding sodium aluminate (at a Si/Al mol ratio of 14.0) to the obtained solution, and then poured into the water to be treated (at a temperature of 25° C., with turbidity of 220 mg/l) to conduct a jar test under the same conditions as those employed in Example 1. The floc appearance time was 5 seconds and the average floc size was E.

This test has proved that not only acid solutions, such as those tested in Examples 1 to 3, but also alkaline solutions of polysilicic acid achieve high degrees of aggregation.

EXAMPLE 5

Samples A13, A14 and A15 were prepared by taking small quantities of the alkaline solution of polysilicic acid prepared in Example 4. The samples A13 to A15 were added to the low-temperature water to be treated (at 15° C., with a turbidity of 220 mg/l) together with a solution of copper sulfate, zinc chloride and manganese chloride, respectively (with each specimen and the corresponding solution individually poured at the same mol ratios and in the same quantities as in Example 2), to conduct aggregation tests. The floc appearance time and average floc size with each sample were as shown in Table 4.

TABLE 4

| Sample | 13(Cu) | 14(Zn) | 15(Mn) |
|---|---|---|---|
| Floc Appearance Time (Sec) | 10 | 15 | 10 |
| Average Floc Size | E | F | D |

Obviously, the alkaline solution of polysilicic acid also achieved high degree of aggregation in the water of low temperature in the presence of different kinds of metallic ions.

EXAMPLE 6

Two liters of a solution of silicic acid with a pH of 2.0 and a silicon concentration of 3.3 percent was obtained by adding, with stirring, 1 liter of an aqueous solution of water glass prepared by dilution commercially available water glass of class 4 with water, with the silicon concentration adjusted to 6.6 percent, to 1 liter of 1.3N-HCl. Thirty milliliter each of the obtained acidic solution of silicic acid was taken into nine beakers for Samples B1 to B9. Sample B1 was prepared by adding 2N-HCl until pH became 1.0 and adding water until the volume became 50 ml. Samples B2 to B9 were prepared by adding various kinds of metal salts, adjusting pH to 1.0 with 2N-HCl, and adding water until the volume became 50 ml. The gelling time of Samples B1 to B9 was measured by keeping them at a temperature of 60° C. The results are shown in Table 5.

TABLE 5

| Sample No. | Added Metal Salt | Quantity Added (g) | Gel Time (hr.) |
|---|---|---|---|
| B1 | — | 0 | 23 |
| B2 | Sodium chloride (NaCl) | 0.52 | 22 |
| B3 | Cupric chloride ($CuCl_2.2H_2O$) | 1.52 | 16 |
| B4 | Magnesium chloride ($MgCl_2.6H_2O$) | 1.82 | 20 |
| B5 | Calcium chloride ($CaCl_2$) | 0.99 | 20 |
| B6 | Aluminum chloride ($AlCl_3.6H_2O$) | 2.16 | 16 |
| B7 | Ferric chloride ($FeCl_3.6H_2O$) | 2.41 | 52 |
| B8 | Nickel chloride ($NiCl_2.6H_2O$) | 2.12 | 21 |
| B9 | Manganese chloride ($MnCl_2.4H_2O$) | 1.77 | 21 |

As is obvious from the above table, the solution of silicic acid added with ferric chloride did not gel until very much longer than the solutions of silicic acid added with the salts of other metals.

EXAMPLE 7

Two liters of a solution of silicic acid with a pH of 4.0 and a silicon concentration of 1.6 percent was obtained by adding, with stirring, 1 liter of an aqueous solution of water glass prepared by diluting commercially available water glass of class 4 with water, with the silicon concentration adjusted to 3.2 percent, to 1 liter of 0.9N-$H_2SO_4$. By gently stirring at 20° C. for 2 hours, the obtained acidic solution of silicic acid was polymerized into a solution of polymerized silicic acid having an limiting viscosity of $0.17 \times 10^{-2}$ ml/g. Five hundred milliliter each of the solution of polymerized silicic acid was taken into beakers for Samples B10 to B14. Sample B10 was prepared by adjusting pH to 1.5 with 7.2N-$H_2SO_4$ and adding water until the volume became 800 ml. Sample B11 was prepared by dissolving 47.6 g of aluminum sulfate, adjusting pH to 1.5 with 7.2N-$H_2SO_4$, and adding water until the volume became 800 ml. Sample B12 was prepared by dissolving 38.6 g of ferric chloride, adjusting pH to 1.5 with 7.2N-$H_2SO_4$, and adding water until the volume became 800 ml. The gel time of Samples B10 to B12 was measured by keeping them at a temperature of 20° C. The results are shown in Table 6.

TABLE 6

| Sample No. | Added Metal Salt | Quantity Added (g) | Gel Time (hr.) |
|---|---|---|---|
| B10 | (None) | 0 | 1875 |
| B11 | Aluminum sulfate ($Al_2(SO_4)_3.18H_2O$) | 47.6 | 875 |
| B12 | Ferric chloride ($FeCl_3.6H_2O$) | 38.6 | Over 5000 |

When 5000 hours has elapsed after preparation, a jar test was performed on Sample B12 by pouring it into water added with kaolin. The testing conditions were as follows: Turbidity of raw water=110 degree, flocculant (Sample B12) pouring rate=1.0 ml/l, water temperature=12.5° C., rapid stirring=120 rpm for 2 minutes, medium-speed stirring=60 rpm for 3 minutes, and slow stirring=30 rpm for 2 minutes. Flocs of 1.5–2.0 mm diameter appeared in 18 seconds. When the solution was allowed to stand for 5 minutes after the completion of the jar test, the turbidity of the supernatant was 0.1 degree.

As obvious from the above test, the solution of polymerized silicic acid containing ferric ions in the form of ferric chloride has proved to steadily maintain a very high aggregating ability, without gelling for as long a time as over 5000 hours.

EXAMPLE 8

Six hundred milliliters of a solution of silicic acid with a pH of 2.0 and a silicon concentration of 3.3 percent was obtained by adding, with stirring, 300 ml of an aqueous solution of water glass prepared by diluting commercially available water glass of class 4 with water, with the silicon concentration adjusted to 6.6 percent, to 300 ml of 1.3N-HCl. After dissolving 100 g of ferric chloride, water was added to the solution until the volume became 800 ml. Forty milliliters each of the obtained solution of silicic acid containing iron ions was taken into seven beakers for Samples B13 to B20. After dissolving different kinds of metal salts, as in Example 1, Samples B13 to B20 were prepared by adjusting pH to 1.0 with 2N-HCl and adding water until the volume became 50 ml. The gel time of Samples B13 to B20 was measured by keeping them at a temperature of 60° C. The results are shown in Table 7.

TABLE 7

| Sample No. | Ferric Chloride (g) | Coexisting Metal Salt | Quantity Added(g) | Gel Time(hr.) |
| --- | --- | --- | --- | --- |
| B13 | 5.0 | Sodium chloride (NaCl) | 0.52 | 46 |
| B14 | 5.0 | Cupric chloride ($CuCl_2.2H_2O$) | 1.52 | 36 |
| B15 | 5.0 | Magnesium chloride ($MgCl_2.6H_2O$) | 1.82 | 38 |
| B16 | 5.0 | Calcium chloride ($CaCl_2$) | 0.99 | 39 |
| B17 | 5.0 | Aluminum chloride ($AlCl_3.6H_2O$) | 2.16 | 30 |
| B18 | 5.0 | Ferric chloride ($FeCl_3.6H_2O$) | 2.41 | 55 |
| B19 | 5.0 | Nickel chloride ($NiCl_2.6H_2O$) | 2.12 | 38 |
| B20 | 5.0 | Manganese chloride ($MnCl_2.4H_2O$) | 1.77 | 38 |

As comparison of Table 7 with Table 5 shows that iron ions used with other metal ions are effective in delaying the gelling of silicic acid as same as when they are used singly.

A jar test was performed on Samples B13 to B20. The testing conditions were as follows: The turbidity of raw water=110 degrees, flocculant pouring rate=1.0 ml/l, water temperature=12.5° C., rapid stirring=120 rpm for 2 minutes, medium-speed stirring=60 rpm for 3 minutes, and slow stirring=30 rpm for 2 minutes. The results are shown in Table 8.

TABLE 8

| Sample No. | Floc Appearance Time (sec.) | Average Floc Size (mm) | Turbidity of Supernatant 5 Minutes after Completion of Jar Test(degree) |
| --- | --- | --- | --- |
| B13 | 25 | D | 0.3 |
| B14 | 20 | E | 0.2 |
| B15 | 25 | E | 0.1 |
| B16 | 25 | E | 0.1 |
| B17 | 150 | E | 0.1 |
| B18 | 25 | E | 0.1 |
| B19 | 30 | E | 0.2 |
| B20 | 25 | E | 0.1 |

As is obvious from the above, flocculants made of the solutions of silicic acid containing iron ions exhibit very high aggregating ability in the presence of other metal ions, too.

As stated in the foregoings, the flocculants of this invention maintain excellent aggregating ability without gelling for a much longer time than conventionally used activated silicic acid. Even after storage of long hours, their effectiveness is not lost. They can be used as either the main or the aggregation aids for water treatment.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A flocculant for water treatment which is an aqueous solution containing a polysilicic acid having a limiting viscosity of not less than about twice that of monosilicic acid and a water-soluble salt of metal capable of forming a hydroxide in water, said solution having a pH of not higher than about 2 or not lower than about 11.

2. A flocculant for water treatment which is an aqueous solution of claim 1 wherein the metal is selected from the group consisting of aluminum, iron, zinc, copper, magnesium, manganese, lead, cobalt, calcium and tin.

3. A flocculant for water treatment comprising an aqueous solution containing a polysilicic acid having a limiting viscosity of not less than about twice that of monosilicic acid and of which the gel time is prolonged by having added thereto a substance able to generate ferric ion in the solution.

4. A flocculant for water treatment of claim 3, wherein said substance able to generate ferric ion is ferric chloride.

5. A flocculant for water treatment of claim 3, wherein said silicic acid solution has further added thereto a metal salt other than the substance able to generate ferric ion.

6. A process of prolonging the gel time of an aqueous solution of polysilicic acid having a limiting viscosity not less than about twice that of monosilicic acid which comprises providing ferric ion in said solution.

* * * * *